UNITED STATES PATENT OFFICE.

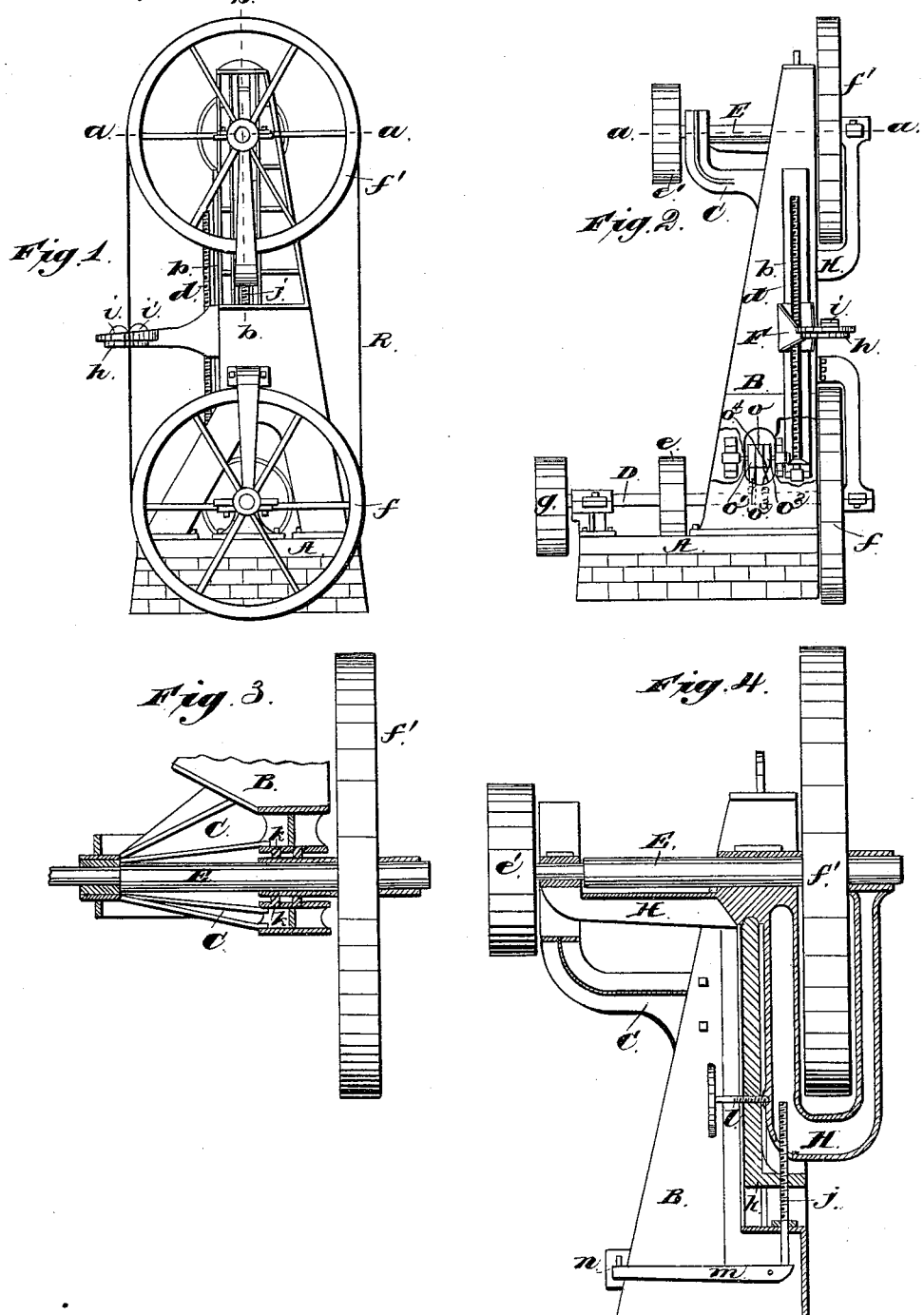

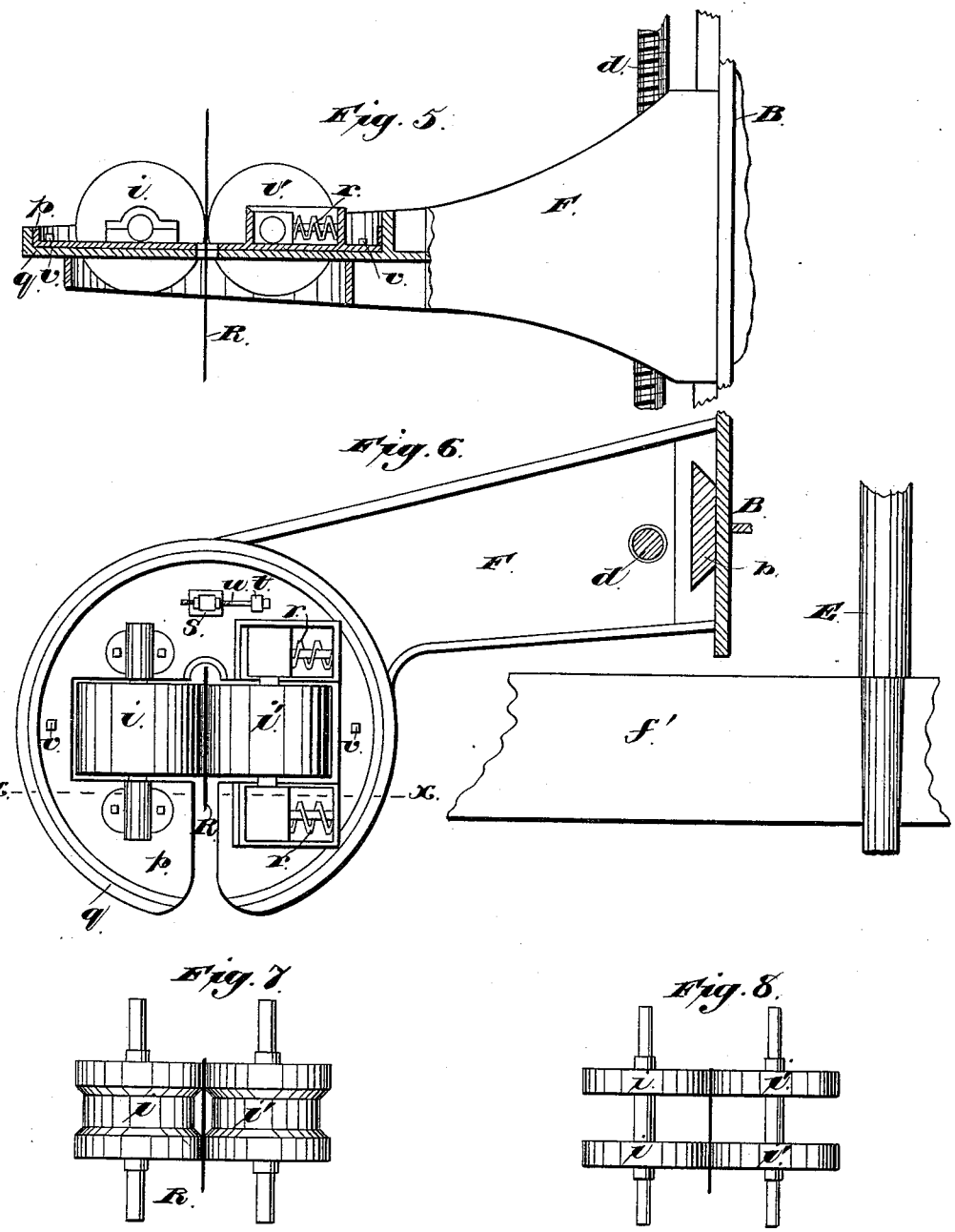

DAVID K. ALLINGTON, OF EAST SAGINAW, MICHIGAN.

BAND-SAW MACHINE.

SPECIFICATION forming part of Letters Patent No. 337,912, dated March 16, 1886.

Application filed October 26, 1885. Serial No. 180,916. (No model.)

*To all whom it may concern:*

Be it known that I, DAVID K. ALLINGTON, a citizen of the United States, residing at East Saginaw, in the county of Saginaw, State of Michigan, have invented certain new and useful Improvements in Band-Saw Machines, of which the following is a specification, reference being had therein to the accompanying drawings.

My invention relates to band-saw machines; and it consists in the construction and arrangement of the parts which will be more fully hereinafter described, and pointed out in the claims.

In my Patent No. 327,428, dated September 29, 1885, I have illustrated and described a machine with two columns or ribbed pillars, and in my present invention, which is an improvement on the invention described and claimed in said patent, I design to accomplish the same result with a machine much simpler in construction.

The object of my invention therefore is to provide a machine employing only a single ribbed pillar or column, which shall be more readily and easily handled and understood than the one described in the patent aforesaid, lighter in its construction, and equally efficient in its use.

A further object of my invention is to provide a saw-guide which will be an absolute guide to the saw, the guide-wheels thereof running in contact with the saw and at the same speed.

Heretofore the guides used have to be placed a short distance from the saw to prevent friction, thus allowing the saw to run from a true line of its cut before the guide takes effect, as the guide cannot affect the saw until it runs sufficiently to come into contact with the said guide.

I attain these objects by the mechanism illustrated in the accompanying drawings, wherein like letters of reference indicate similar parts in the several views, and in which—

Figure 1 is a side elevation of the machine, illustrating the construction of the ribbed pillar or column and the arrangement and relative position of the different parts. Fig. 2 is a front elevation of the machine, showing the bracket which supports the journal of the shaft near the end opposite the saw, the mechanism for operating the guide-arm that supports the saw-guide on its outer end, and all the relative parts appertaining thereto. Fig. 3 is an enlarged horizontal sectional view of the upper part of the machine, taken on the dotted lines $a\ a$ in Figs. 1 and 2, and illustrating the construction of the different parts. Fig. 4 is an enlarged vertical sectional view of the upper part of the machine through the line $b\ b$, Fig. 1, showing the construction of the vertical sliding plate and the adjusting-yoke. Fig. 5 is a section on line $x\ x$, Fig. 6, showing the circular plate on which is mounted the journals for the guide-wheels. Fig. 6 is a top plan view of the guide-arm, and shows the general construction of the saw-guide on its outer end in its relative position to the saw-wheels. Figs. 7 and 8 are top plan views of modified forms of guide-wheels which can be substituted for those shown in Fig. 6.

A represents a base-plate, so constructed that it can be secured to any suitable foundation. On this plate is erected and securely fastened a single ribbed pillar or column, B, said column being provided with a rigid bracket, C, having a slot in its center between the vertical sides on its outer end of sufficient size to receive the journal-box near the end of the shaft farthest from the saw. This slot is of such length as to give the desired vertical movement to the upper saw-wheel, $f'$, as shown in cross-section in Fig. 3, thus holding the shaft E rigidly in position except in its vertical movement.

The upper end of the column B is divided into two parts to receive the vertically-sliding plate $k$, which plate slides in a vertical groove made by two projections or ribs on the inner sides of said column. The center journal of the yoke H is so constructed as to fit between these ribs, so that it can be adjusted vertically to any desired height for the length of the saw and be adjustable to hold the saw taut by means of the lever $m$ and weight and lever $n$. The sliding plate $k$ has a projecting lug at the lower portion thereof, through which the adjusting-screw $j$ is threaded for the purpose of raising and lowering the upper saw-wheel, $f'$.

The upper end of the sliding plate $k$ is made on a circle, and fits in a corresponding circular groove in the yoke H, in which the upper shaft, E, is journaled, said shaft E being lined to give the desired guide to the saw by the screw $l$, which is threaded through the vertical sliding plate $k$ and engages with the yoke H. The arm of the yoke H, which reaches out to the outer end of the bracket C, may be left off and a separate box or journal placed on the end of the shaft in the slot in the bracket C, so that it cannot move in any direction except vertically.

The entire machine is driven by the pulley $g$ by a belt from any suitable power. The saw-wheel $f'$ on the shaft E may be constructed of smaller diameter than the wheel $f$ on the shaft D. The pulleys $e$ and $e'$ are constructed of substantially the same diameter, and are traversed by a belt which, when the speed of the lower saw-wheel is retarded by the saw entering the cut, or from any other cause, will equalize the speed and prevent the upper saw-wheel from running faster than the lower one.

On the front side of the column B, and secured thereto, is a beveled plate, $b$, on which is fitted and slides vertically the guide-arm F, which is operated by beveled gears or by a worm and a worm-wheel at the lower end. The horizontal shaft on which one of the gears is mounted is furnished with three pulleys, $o$, $o'$, and $o^2$, the center pulley, $o$, being fast, and the two outer pulleys, $o'$ and $o^2$, running loose. A straight belt, $o^3$, is run from the shaft D to one of the loose pulleys, as $o'$, and a crossed belt, $o^4$, to the other loose pulley, $o^2$. By shifting the belt $o^3$ onto the fast pulley $o$ the screw $d$ will be run in one direction, and by shifting the crossed belt $o^4$ onto the same pulley $o$ the action of the said screw $d$ will be reversed, thereby raising or lowering the guide-arm F to any point desired by the operator. These belts $o^3$ and $o^4$ will be operated by any suitable and well-known belt-shifter, and need no description herein.

On the outer end of the guide arm F a saw-guide, $h$, is mounted, which is constructed so as to have the said guide-arm terminate in a circular flanged plate, $q$, cut away to receive the saw and guide-wheels, the center of which is about the center of the width of the saw. Inside of the flanges of the circular plate $q$ is fitted the circular plate $p$, which is cut away to receive the saw R and guide-wheels, and on which is mounted and journaled the said guide-wheels $i$ and $i'$, the wheel $i$ being hung in rigid boxes or journal-bearings, and the wheel $i'$ in horizontally-adjustable boxes, thus keeping the wheel $i'$ in contact with the saw by means of the springs $r$ mounted in the horizontally-adjustable boxes.

As illustrated in Fig. 6, the wheels $i$ and $i'$ are plane-surfaced, while those illustrated as modifications in Figs. 7 and 8 are grooved and doubled wheels, respectively.

On the lower plate, $q$, is placed a lug, $s$, extending up through the upper plate through a slot of sufficient size to admit of the adjustment of the saw to the true line of its cut by the bolt $u$, which is secured to the lug $t$ on the upper plate, $p$, and passes through the lug $s$, having a nut on each side of said lug. By operating these nuts the plate $p$ may be turned to adjust the position of the guide-wheels relatively to the saw-blade, so that they will guide the saw in a true line of the cut, and when thus set the plates are secured together by the bolts $v$. By these wheels $i$ and $i'$ running with a pressure in contact with the saw it will be seen that the saw cannot deviate in the least from a true line of its cut without being acted upon by the guide. These guide-wheels may be constructed of any suitable material, and may be covered with leather, rubber, or any other suitable substance to prevent friction.

It is obvious that many minor details in the construction of the parts could be made and substituted for those shown and described without in the least departing from the nature and principle of my invention.

Having thus described my invention, what I claim as new, and desire to secure by Letters Patent, is—

1. In a band-saw machine, the combination of a ribbed supporting-column mounted on a suitable base, a vertically-sliding plate adjustable upon said column and having an extended arm, a guiding mechanism mounted thereon, and a series of pulleys which operate a screw to raise and lower the guiding-arm, substantially as described.

2. In a band-saw machine, the combination of a single supporting-column mounted on a suitable base, band-wheels surrounded by an endless band-saw, a vertically-adjustable yoke having an extended arm operating therewith and carrying the upper band-wheel, a vertically-sliding guide-arm engaging with a beveled plate secured to the column, a vertical screw operated by bevel-gears and pulleys for raising and lowering the said guide-arm, guide-wheels mounted in the guide-arm having rigid and adjustable bearings, and means for adjusting the saw to the true line of its cut, substantially as described.

3. In a band-saw machine, the combination of a single supporting-column mounted on a suitable base, a beveled plate secured to the column, a guide-arm engaging with said plate and extending outwardly at right angles thereto, a circular flanged plate on the end of the guide-arm, rigid and adjustable journal-boxes mounted in the circular plate, suitable guide-wheels engaging the saw-blade, and a lug having a bolt adjustable by means of nuts, whereby the saw may be always directed to its true line of cut, substantially as described.

4. In a band-saw machine, the combination of a single supporting-column, B, mounted upon a suitable base, A, a vertically-adjustable yoke, H, carrying the upper band-wheel, a beveled plate, $b$, on the supporting-column, a guide-arm, F, engaging said plate, a circular flanged plate, $q$, at the extremity thereof, rigid and horizontally-adjustable journal-boxes, a saw-adjusting device, as $s$, and means for operating the guide-arm to raise or lower it, substantially as described.

In testimony whereof I affix my signature in presence of two witnesses.

DAVID K. ALLINGTON.

Witnesses:
F. E. MOORE,
S. C. SLADE.